March 28, 1967 LE ROY S. LADD ETAL 3,311,522
PROCESS FOR BONDING CRYSTALLINE COMPONENTS
AND COMPOSITE ARTICLE PRODUCED THEREBY
Filed Feb. 25, 1963 3 Sheets-Sheet 1

LeRoy S. Ladd
William F. Parsons
Robert Weagley
INVENTORS

BY

ATTORNEYS

March 28, 1967  LE ROY S. LADD ETAL  3,311,522
PROCESS FOR BONDING CRYSTALLINE COMPONENTS
AND COMPOSITE ARTICLE PRODUCED THEREBY
Filed Feb. 25, 1963  3 Sheets-Sheet 2
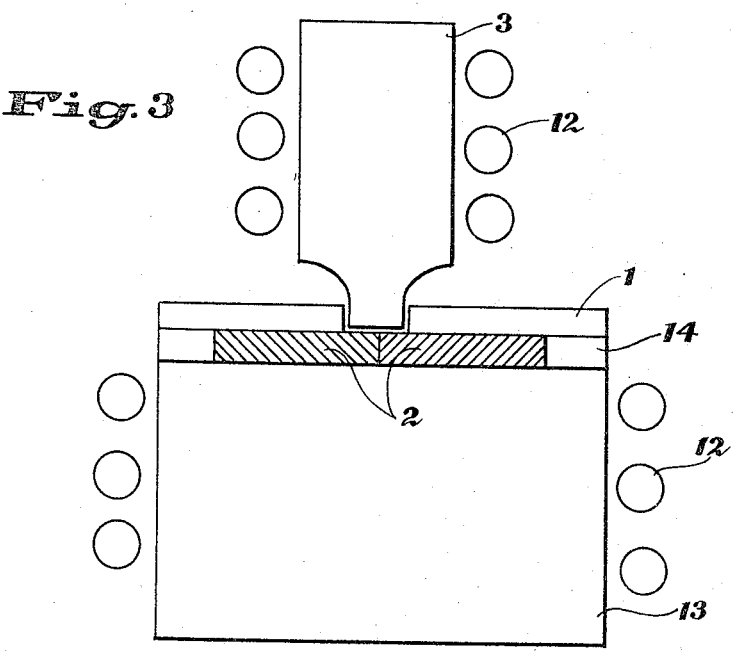
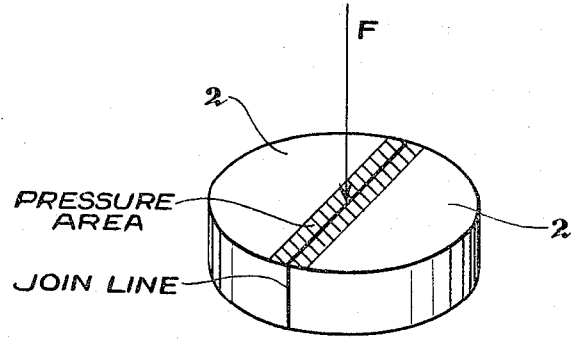
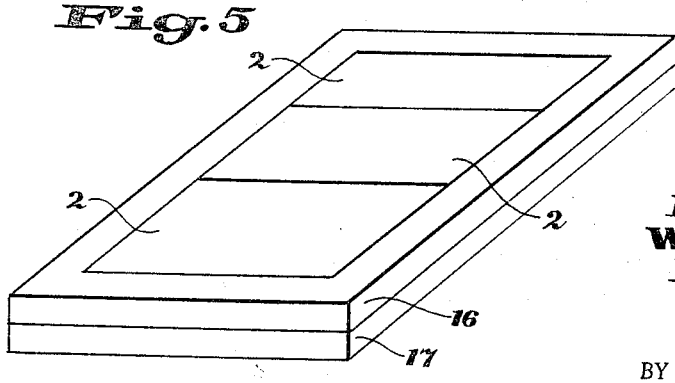
LeRoy S. Ladd
William F. Parsons
Robert Weagley
INVENTORS
BY
ATTORNEYS

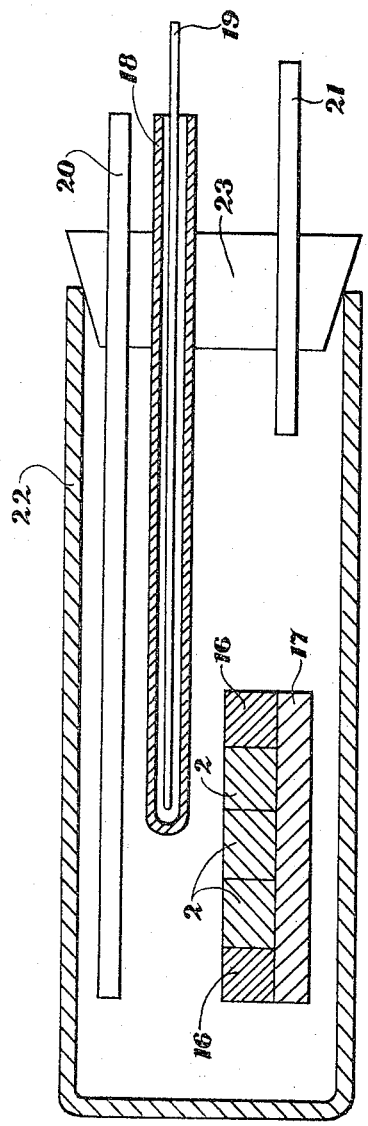
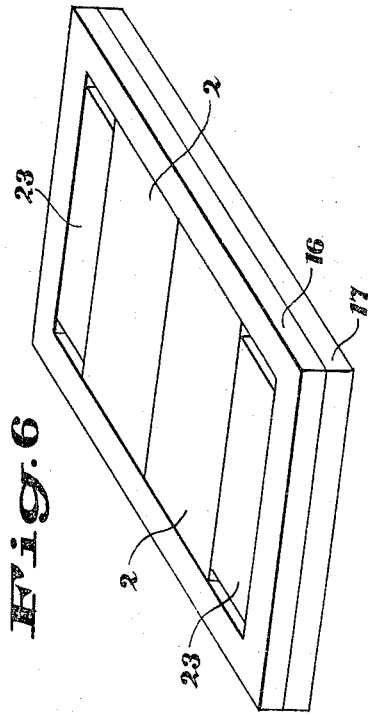

United States Patent Office 3,311,522
Patented Mar. 28, 1967

3,311,522
PROCESS FOR BONDING CRYSTALLINE COMPONENTS AND COMPOSITE ARTICLE PRODUCED THEREBY
Le Roy S. Ladd, William F. Parsons, and Robert J. Weagley, Rochester, N.Y., assignors to Eastman Kodak Company, Rochester, N.Y., a corporation of New Jersey
Filed Feb. 25, 1963, Ser. No. 260,421
5 Claims. (Cl. 156—306)

This invention relates to composite crystalline elements and to methods and apparatus for producing composite crystalline elements. More particularly, this invention relates to methods and apparatus for bonding sections of polycrystalline solids to themselves to produce large elements.

The polycrystalline optical elements with which the present invention is primarily concerned are produced by hot pressing fine powders of plastically deformable substances to form dense, homogeneous, optically useful elements of substantially theoretical density. More comprehensive discussions of these novel elements can be found in U.S. applications Ser. No. 849,606 filed Oct. 29, 1959 in the names of Edward Carnall, Jr., et al. and Ser. No. 849,571 filed Oct. 24, 1959 in the names of Edward Carnall, Jr., et al.

The individual elements are produced under pressures of at least 15,000 pounds per square inch, and often pressures of several times this lower limit are employed. Thus it will be recognized that a practical limit is imposed upon the size of the individual elements which may be produced, since a single element of, for example, 3 square feet would require a press capable of applying a force of more than 6,000 tons if the preferred pressure of 30,000 pounds per square inch is employed. Clearly, the cost of such a press would make it impractical to produce large optically useful elements in a single operation.

There are many commercially available cements that are useful for bonding solid crystalline materials to themselves and to other materials. However, these cements may not be stable at high temperatures and, in the case of joining two optical materials, the bond line may impair the optical homogeneity of the bonded product.

An object, therefore, of the present invention is to provide an article of manufacture consisting of bonded sections of polycrystalline materials.

Another object is to provide a homogeneous solid of polycrystalline materials wherein the bonds do not impair the optical homogeneity of the composite element.

A still further object is to provide an optical element of bonded individual polycrystalline segments wherein the bonds are heat stable to a degree at least equal to that of the individual segments.

Yet another object is to provide an infrared transmitting optically useful substance consisting of bonded segments of polycrystalline materials wherein the bonds display physical strength substantially equal to that of the individual elements.

Another object is to provide a method of bonding polycrystalline substances to form such optically useful composite elements.

Still another object of this invention is to provide novel apparatus for bonding such infrared transmitting composite elements.

Other objects will appear hereinafter.

According to the present invention, pieces of polycrystalline materials are bonded together through the proper application of heat and pressure at temperatures well below the melting points of the materials, and frequently hundreds of degrees below the melting points of the materials. Bonding is effected by employing a sufficient amount of heat and pressure to cause plastic flow of the materials so that the faces being joined flow together.

In accordance with a feature of this invention polycrystalline elements are bonded together under conditions of high pressure, high temperature, and high vacuum or in an atmosphere of inert gas by applying force to the elements in a direction normal to the faces to be joined.

In accordance with another feature of this invention polycrystalline substances are joined by the application of high pressure under conditions of high temperature and high vacuum or in an atmosphere of inert gas with the force being applied in a direction parallel to the faces to be joined.

A further feature of this invention is the joining of polycrystalline substances under pressure in a mold under conditions of high pressure and high temperature in a normal atmosphere.

The invention will be further understood by reference to the following detailed description and drawings in which:

FIG. 3 is a section of a device for bonding polycrystalline substances in accordance with this invention;

FIG. 4 is a view of two elements illustrating the manner in which force is applied by the device of FIG. 3;

FIG. 5 is a perspective view of a simplified device for bonding two or more polycrystalline elements in accordance with the present invention;

FIG. 6 is a perspective view of a modification of the device shown in FIG. 5;

FIG. 7 is an elevation view, partially in section, of an apparatus wherein the devices shown in FIG. 5 or FIG. 6 can be employed to practice the present invention in a preferred manner.

Figure 1:
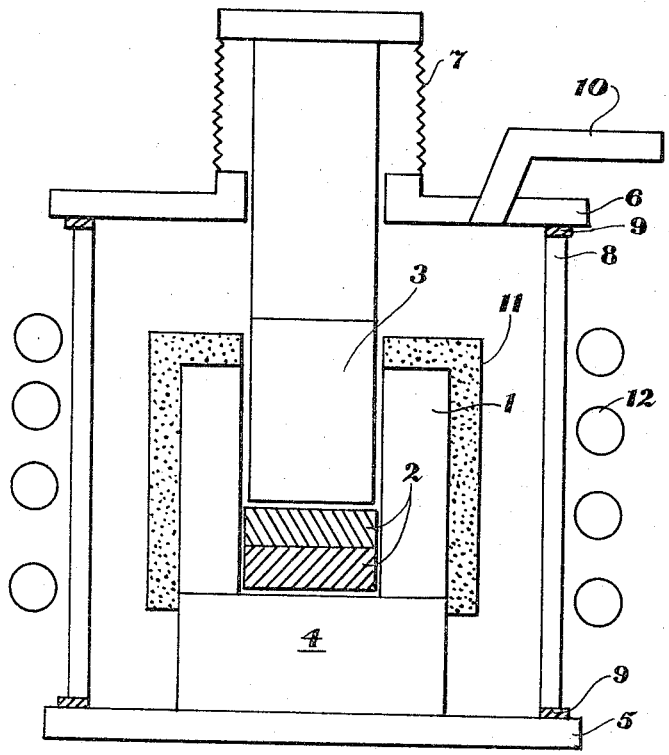
FIG. 1 is a view of a device for joining polycrystalline substances in accordance with this invention.

The device shown in FIG. 1 comprises a cylinder 1, preferably of molybdenum, wherein the polycrystalline substances 2 which are to be joined are placed. A plunger 3, preferably consisting of molybdenum, supplies the necessary pressure for bonding. The cylinder 1 rests on a mold base 4. The bottom plate 5, top plate 6, bellows 7, quartz tube 8, and gaskets 9 comprise a sealed chamber capable of holding a vacuum or inert gas. The vacuum or inert gas outlet 10 is shown in top plate 6. A graphite cylinder 11 surrounds the molybdenum cylinder 1 and acts as a susceptor for induction heating coil 12. The graphite cylinder 11 is thus heated by coil 12 and in turn heats cylinder 1. The pressure for bonding is provided by a hydraulic press (not shown), and the plunger 3 is free to move through connection with the flexible bellows 7. The vacuum or inert atmosphere is introduced through gas outlet 10 by means not shown. The sealed chamber is evacuated through outlet 10 to a vacuum of approximately 300 microns. The temperature of the two elements 2 is adjusted to a temperature below their melting point, a pressure of at least 12,000 p.s.i. is applied to the elements by plunger 3, and these conditions are maintained for at least 5 minutes. The pressure is then removed and the apparatus allowed to cool to about 200° C. and the bonded elements removed from the apparatus.

Figure 2:
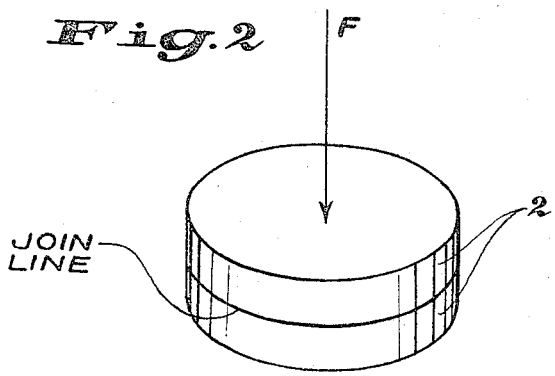
FIG. 2 is a view of two polycrystalline substances illustrating the manner in which force is applied by the device of FIG. 1.

FIG. 2 illustrates the manner in which force F is applied to the elements 3 during operation of the apparatus described in FIG. 1. This embodiment of the invention is useful for producing sections of material thicker than those which can be conveniently pressed from powder.

The preferred practice of the present invention includes bonding in a vacuum or inert atmosphere. However, satisfactory results have been obtained by bonding in air. Some oxidation and other effects have been encountered when bonding in other than a vacuum or inert atmosphere, but these effects are immaterial for many uses. For instance, the infrared transmission of zinc sulfide is impaired only in the short wavelength region from 1–4 micron and transmission within the 4–15 micron region is not appreciably reduced when bonding in air is practiced. Since the 4–15 micron range is useful for many applications of polycrystalline zinc sulfide, the oxidation and other effects are not necessarily objectionable. The present invention can be practiced at temperatures often hundreds of degrees below the melting points of the substances being joined, and this may in large measure account for the acceptable bonding in air. It is envisioned that large sections of polycrystalline material on the order of up to several square feet will be produced, and thus the provision of an inert atmosphere or vacuum might, in many instances, prove cumbersome and expensive for practical and economical bonding of large sections.

FIG. 3 illustrates another embodiment of the invention wherein the elements to be bonded together are placed side by side and pressure is applied in a direction parallel to the plane of joinder. While no chamber is illustrated in this embodiment, it is to be understood that such is contemplated should the use of a vacuum or inert atmosphere be desirable. The operation of this embodiment of the invention is in many ways similar to that illustrated in FIG. 1, but the solid polycrystalline elements 2 to be joined are held by retaining ring 14 made from stainless steel and by clamping plate 15. The plunger 3 and base 13 are surrounded by a two-section induction coil 12 which supplies the heat for bonding. Pressure is delivered through plunger 3 by a hydraulic press not shown. The elements 2 are placed so that pressure from the plunger 3 is exerted parallel to the faces to be bonded and, at correct bonding pressure and temperatures, the elements 2 will flow so that the plunger 3 indents the material slightly. The flow of the material is sufficiently hydrostatic in nature to cause the bond faces to flow together and form a bond of good optical quality and physical strength.

FIG. 4 illustrates the relationship of the bond line to the applied force F during operation of the apparatus described in FIG. 3.

The device illustrated in FIG. 5 enables the invention to be practiced without employing an external force-producing mechanism such as the hydraulic press used in the above-described embodiments. According to the present embodiment, the elements 2 are placed and secured within a metallic frame 16 having a coefficient of expansion substantially lower than that of the elements 2. The frame 16 and elements 2 rest on a plate 17 which is preferably coated with graphite or other suitable release agent. After the device is assembled in the above-described fashion, it is heated to a temperature below the melting temperature of elements 2 whereupon bonding pressures are produced by the expansion of the elements 2 against frame 16. Frame 16 exerts a reciprocal force against the elements and forces them together. The pressure developed is sufficient to cause bonding of elements 2 and to form a joint of good strength.

The use of bonding frame 16 to exert force on the polycrystalline elements 2 by means of differences in coefficients of expansion is a simplified approach having obvious advantages. However, a frame having a thermal coefficient of expansion sufficiently lower than that of the polycrystalline substance is not always conveniently available. For instance, polycrystalline zinc sulfide has an expansion coefficient of about $8.2 \times 10^{-6}/C.°$ while the preferred molybdenum frame has an expansion coefficient of about $5.4 \times 10^{-6}/C.°$. This shortcoming is remedied by including within the frame 16 a filler block 23 having a relatively high linear expansion coefficient as shown in FIG. 6. Suitable filler block materials will be apparent to those skilled in the art. A preferred material is nickel-base alloy commercially available under the name Waspaloy which has a linear expansion coefficient of $15 \times 10^{-6}/C.°$.

The devices illustrated in FIG. 5 and FIG. 6 may be used as shown in FIG. 7 if bonding in a vacuum or inert atmosphere is desired. According to this embodiment, elements 2, frame 16 and plate 17 are assembled and placed in a container 22 having a stopper 24 securing the hermetic integrity of container 22. Stopper 24 has provided there through an inlet channel 20, an outlet channel 21, and a thermocouple well 18. A thermocouple 19 is situated in the thermocouple well. The container 22 is placed in a furnace (not shown) and heated to the desired temperature while an inert atmosphere is circulated through container 22 by means of inlet channel 20 and outlet channel 21. Alternatively, a vacuum may be maintained in the container 22 while heating and bonding.

EXAMPLE 1

Two cylindrical elements of hot-pressed polycrystalline zinc sulphide were placed as shown in FIG. 1. The apparatus was evacuated to 300 microns. The temperature was brought to 820° C., and a pressure of 20,000 p.s.i. was applied as shown in FIG. 2. These conditions were maintained for five minutes. The pressure was removed and the apparatus was cooled to about 200° C., and the bonded elements removed from the apparatus. The piece was an integral, homogeneous cylinder of polycrystalline zinc sulphide. The bond line was not visible to the naked eye.

EXAMPLE 2

Two pieces of hot-pressed polycrystalline zinc sulphide were assembled in the apparatus shown in FIG. 3. The apparatus was heated to an indicated temperature of 800° C. over a period of 14½ minutes. Pressure was applied equivalent to 12,000 p.s.i. over the area covered by the plunger as shown in FIG. 4. Pressure and temperatures were maintained at these values for five minutes. Then pressure was removed and the apparatus cooled. The two elements of zinc sulphide were bonded so strongly that the piece broke at other than the bond line when strength-tested.

EXAMPLE 3

Two elements of hot-pressed polycrystalline magnesium fluoride were placed in the apparatus shown in FIG. 1. The position of the polycrystalline elements and the direction of pressure, perpendicular to the faces to be joined, is shown in FIG. 2. The chamber was evacuated to 150 microns. The temperature was brought to 900° C. and pressure equivalent to 21,000 p.s.i. was applied on the joint faces. Pressure and temperature were maintained at 21,000 p.s.i. and 900° C. respectively for 10 minutes.

The apparatus was allowed to cool to about 200° C. and the bonded piece removed. It was a well-bonded unit and broke in a place other than the bond line when strength-tested.

EXAMPLE 4

Two elements of hot-pressed magnesium fluoride were placed in the apparatus shown in FIG. 1 in a position as shown in FIG. 4. The system was evacuated, and the temperature was brought up to 860° C. Pressure equivalent to 21,000 p.s.i. was applied. It will be noted that the pressure is applied parallel to the faces to be bonded rather than perpendicular to the faces as in Example 3. Temperature and pressure were maintained at these values for 7 minutes. The heat was turned off, pressure removed, and apparatus allowed to cool to about 200° C. The bonded piece of magnesium fluoride was an integral bonded unit. The bond line was nearly invisible. The bond was as strong as the elements themselves, since the bonded piece broke at other than the bond line when strength-tested.

EXAMPLE 5

Two cylindrical elements of hot-pressed zinc sulphide were placed as shown in FIG. 2. The apparatus was assembled as shown in FIG. 1 and a vacuum was drawn. The temperature was brought up to 820° C. and a pressure equal to 40,000 p.s.i. was applied, and the conditions maintained for 5 minutes. The apparatus was cooled to about 200° C. and the bonded piece was removed. The piece was an integral homogeneous cylinder of polycrystalline zinc sulphide.

EXAMPLE 6

A rectangular frame was fabricated from a molybdenum-titanium alloy. The dimensions of the rectangular slot in frame which contains the elements to be bonded were 2.506 inches by .502 inch by .192 inch. Three elements of hot-pressed magnesium fluoride, two of which were .999 inch long by .499 inch wide by .185 inch thick and one of which was .5 inch long by .5 inch wide by .185 inch thick, were assembled into the frame as shown in FIG. 5. The faces to be joined were felt-polished. The frame containing the magnesium fluoride pieces was placed on a plate constructed of stainless steel and coated with graphite. The assembly was placed in a quartz tube container closed at one end and fitted with a rubber stopper containing a thermocouple well and gas inlet to an outlet channel, as shown in FIG. 6. The quartz tube was placed in a muffle furnace, argon flow was started to the tube, and the assembly heated to 850° C. The temperature was maintained at 850° C. for 20 minutes. The assembly was cooled to 200° C., and the piece of polycrystalline magnesium fluoride was removed. Both of the bonded joints were complete and strong. No bonding occurred between the frame and the magnesium fluoride.

EXAMPLE 7

A bonding frame was fabricated from a molybdenum-titanium alloy. The dimensions of the rectangular slot in frame which contains the elements to be bonded were 8.434 inches by 4.691 inches by approximately .75 inch. Two elements of hot-pressed magnesium fluoride, each of which was 4.665 inches by 4.208 inches by .510 inch, were assembled into the frame as shown in FIG. 5. The faces to be joined were polished. The frame containing the magnesium fluoride pieces was placed on a plate constructed of stainless steel and coated with graphite. The assembly was placed in the tube shown in FIG. 6. The tube was placed in a furnace, argon flow was started into the tube, and the assembly heated to 760° C. The temperature was maintained at 760° C. for 30 minutes. The assembly was cooled to 140° C., and the piece of polycrystalline magnesium fluoride was removed. The bonded joint was complete and strong. No bonding occured between the frame and the magnesium fluoride.

EXAMPLE 8

Two filler blocks of Waspaloy, each of which had dimensions 2.512 inches by 4.635 inches by ½ inch thick were fitted into each end of the molybdenum alloy frame cavity (as shown in FIG. 6). The frame has internal dimensions of 8.434 inches by 4.691 inches. The 4.635 inches dimension of the Waspaloy was .056 inch less than the width of the frame. This permitted the Waspaloy to expand nearly to the frame dimension during bonding because of its higher expansion, but not to exert pressure on the frame.

Two pieces of zinc sulfide were then fitted into the cavity defined by the frame and Waspaloy pieces. The sizes of the two zinc sulfide pieces were such that they fitted the frame cavity within .004", thereby providing a snug fit. The faces of the zinc sulfide to be bonded were polished and other faces were ground.

The frame assembly was placed in the tube to provide inert atmosphere and this assembly was placed in a furnace. The furnace was heated to bonding temperature (730° C.) over a period of about five hours and allowed to dwell at 730° C. for one-half hour. The apparatus was cooled to about 200° C. in the furnace.

The resulting bonded zinc sulfide piece could not be broken by hand pressure. Visual examination indicated that bonding was complete.

Since bonding is effected at temperatures below the melting points of the polycrystalline elements, the materials will not change appreciably in physical or optical properties by grain growth or other reactions. The methods are not restricted by the shape or number of elements to be bonded. The invention is applicable to fabrication of large domes or other geometrical shapes.

Many materials can be bonded by the present invention. For example, hot-pressed or sintered polycrystalline materials can be bonded as can single crystal materials.

The invention has been described in detail with particular reference to preferred embodiments thereof, but it will be understood that variations and modifications can be effected within the spirit and scope of the invention as described hereinabove and as defined in the appended claims.

We claim:

1. A method of forming composite optical elements comprising placing at least two solid homogeneous polycrystalline elements within a frame having a coefficient of expansion lower than that of said elements, heating the frame to a temperature below the melting temperature of said elements, and maintaining the temperature until said elements are bonded together.

2. A method as set forth in claim 1 wherein said temperature is between 760° C. and 900° C.

3. A method as set forth in claim 1 wherein the frame and elements are placed in an inert atmosphere while heating.

4. A method as set forth in claim 1 wherein said frame and elements are placed in a vacuum while heating.

5. A method as set forth in claim 1 including the step of placing at least one filler block having a coefficient of expansion greater than that of the polycrystalline elements within the frame before heating.

References Cited by the Examiner

UNITED STATES PATENTS

| | | | |
|---|---|---|---|
| 2,290,279 | 7/1942 | Farber | 23—135 |
| 2,454,462 | 11/1948 | Kremers et al. | 156—306 X |
| 2,659,658 | 11/1953 | La Lande et al. | 23—88 |
| 2,799,051 | 7/1957 | Coler et al. | 18—59.2 |
| 3,038,527 | 6/1962 | Greten | 156—580 |
| 3,047,052 | 7/1962 | Fridrich | 156—580 |
| 3,098,699 | 7/1963 | Roy | 18—59.2 |

EARL M. BERGERT, *Primary Examiner.*

MAURICE A. BRINDISI, *Examiner.*

E. STERN, C. B. COSBY, *Assistant Examiners.*